United States Patent
Bak et al.

[19]

[11] Patent Number: 6,054,003
[45] Date of Patent: Apr. 25, 2000

[54] METHOD OF PRODUCING A FIBER-REINFORCED, THREE-DIMENSIONAL PRODUCT

[76] Inventors: Henning Bak, Slangebakken 2, Laven, DK-8600 Silkeborg; Torben Vesterggard, Skaldhojej 12, DK-8981 Spentrup, both of Denmark

[21] Appl. No.: 09/090,024

[22] Filed: Jun. 10, 1998

[30] Foreign Application Priority Data

Jun. 10, 1997 [EP] European Pat. Off. .............. 97109364

[51] Int. Cl.[7] .......................... B29C 70/16; B32B 17/04; B32B 27/02; B32B 31/20
[52] U.S. Cl. ..................... 156/180; 156/212; 156/296; 156/308.2; 264/258
[58] Field of Search ..................... 156/212, 228, 156/297, 308.2, 180, 296; 264/258, 277

[56] References Cited

U.S. PATENT DOCUMENTS

| | | | |
|---|---|---|---|
| 2,964,442 | 12/1960 | Hansen | 154/110 |
| 4,404,156 | 9/1983 | Ogletree | 264/162 |
| 5,312,579 | 5/1994 | Druyun et al. | 264/258 |

FOREIGN PATENT DOCUMENTS

| | | |
|---|---|---|
| 0 203 803 A1 | 12/1986 | European Pat. Off. . |
| 0 678 610 A1 | 10/1995 | European Pat. Off. . |
| 19625785 A1 | 1/1997 | Germany . |
| 19625786 A1 | 1/1997 | Germany . |
| 19625797 A1 | 1/1997 | Germany . |
| 19625798 A1 | 1/1997 | Germany . |
| 19625800 A1 | 1/1997 | Germany . |
| 1080520 | 3/1989 | Japan . |
| 2 268 699 | 1/1994 | United Kingdom . |
| WO 95/35200 | 12/1995 | WIPO . |

*Primary Examiner*—Sam Chuan Yao
*Attorney, Agent, or Firm*—Marshall, O'Toole, Gerstein, Murray & Borun

[57] ABSTRACT

The invention relates to a method of producing a fiber-reinforced, three-dimensional product of a plastic material by using a mold in which the product is formed.

16 Claims, 6 Drawing Sheets

METHOD OF PRODUCING A FIBER-REINFORCED, THREE-DIMENSIONAL PRODUCT

BACKGROUND OF THE INVENTION

1. Field of the Invention

The invention relates to a method of producing a fiber-reinforced, three-dimensional product by using a mold in which the product is formed.

2. Description of Related Technology

Methods of forming fiber-reinforced, three-dimensional products of plastic material and reinforcing fibers by molding a planar laminate are known. However, in such prior methods, during production of a three-dimensional shape, the formed planar laminate is not fixed in the mold in which it is deposited. If short or cut fibers are used for reinforcement of the plastic material, the material will normally not be fixed.

As a result, it is not possible to control the orientation and distribution of the fibers when the product is given a three-dimensional shape. Thus, the finished, three-dimensional product will not always have well-defined material properties throughout the product.

Methods are also known wherein the planar laminate is fixed partially in all directions, so that displacement of the deposited material is possible when it is given a three-dimensional shape.

Such potential for displacement in the material means that the orientation of the reinforcement fibers in the end product does not correspond to the orientation that the reinforcement fibers are given in the deposited planar laminate before a three-dimensional shape is applied to it. Thus, in the three-dimensional end product there may be a larger distance between individual reinforcement fibers than when the fibers are deposited in the planar laminate. Thus, at the same thickness of material throughout the surface of the product, the percentage content of reinforcement fibers will fall, decreasing as the molded distance from the planar original laminate increases. As a result of this lower content of reinforcement fibers, the strength will decrease in such parts of the finished product.

The production of a three-dimensional product may take place by depositing a number of layers on a three-dimensional shape, such as described, for example, in U.S. Pat. No. 4,404,156 and U.S. Pat. No. 5,312,579. However, for mass production, a method where a planar laminate is formed initially, and subsequently given its three-dimensional shape by pressing or deep pressing the laminate, would preferably be used.

WO 95/35200 discloses a method of producing a fiber-reinforced, three-dimensional product including the steps of depositing long fibers in a mold consisting of a frame in which a carrier net for the fibers is suspended. The individual layers of a formed planar laminate are positioned in such a manner that only a first end is secured at a frame side. The first ends of the various layers are secured at different frame sides. By this method it is possible, in a pressing procedure giving a product its three-dimensional shape, to obtain a virtually uniform distribution of the fibers, even in areas which are subjected to the longest distance of movement away from the original planar laminate. Unfortunately, this method allows only deposition of layers and reinforcement material uniformly over the entire carrier net.

U.S. Pat. No. 2,964,442 describes frames for placing reinforcing fibers in a parallel distribution, either uniformly or irregularly, to achieve uniform distribution of fibers in a shaped article. However, U.S. Pat. No. 2,964,442 does not disclose how to control the degree and the position of reinforcement in the shaped article.

Therefore, a need exists for a method which allows manufacture of fiber-reinforced, three-dimensional shaped products having defined areas of higher reinforcement.

SUMMARY OF THE INVENTION

The invention provides a method useful in the production of planar (i.e. two-dimensional) products, substantially planar products, or products having substantial third dimensions in which it is possible to provide areas having a relatively high degree of reinforcement. In this manner, the finished product may be given various mechanical properties such as different strengths in different orientations.

The invention provides a method of producing of fiber-reinforced, three-dimensionally shaped products comprising the following steps:
  (a) depositing matrix and reinforcing material to form a laminate on a carrier net which has been fixed in a frame by securing components;
  (b) heating the laminate of step (a);
  (c) pressing the heated laminate of step (b) in a mold into a desired three-dimensional shape to form a three-dimensionally shaped article;
  (d) releasing the three-dimensionally shaped article of step (c) from the mold; and,
  (e) removing the three-dimensionally shaped article of step (d) from the mold, wherein:
  (f) the laminate of step (a) includes defined areas of higher reinforcement relative to the remaining area of the laminate, which defined areas correspond to defined areas of higher strength in the three-dimensionally shaped article; and,
  (g) the frame of step (a) is a positioning frame which allows the laminate to be located in a specific, proper position in the mold.

An apparatus useful in the method comprises a frame which has a marker component and therefore allows positioning of the frame in the mold. Such a marker component can be mechanical, physical, electrical, or optical.

Other objects and advantages of the invention may become apparent to those skilled in the art from a review of the following detailed description, taken in conjunction with the drawings and the appended claims.

BRIEF DESCRIPTION OF THE DRAWINGS

The invention will be explained in further detail below with reference to the accompanying drawings.

The contour of the heating plate 15 corresponds to the non-uniform thickness of the laminate to be heated.

In the various figures of the drawings, identical or corresponding elements have been designated by the same reference numerals and will not be explained in detail in connection with each figure.

DETAILED DESCRIPTION OF THE INVENTION

In step (a) of the inventive method, a planar laminate can be formed by depositing individual layers of matrix and reinforcing materials on a carrier net such as those described in WO 95/35200, the entire disclosure of which is hereby incorporated by reference. The carrier net can be made of any suitable material, including hybrid yarn comprising thermoplastic polymer material, such as polyester or polyolefin, which allows further processing.

Figure 1:
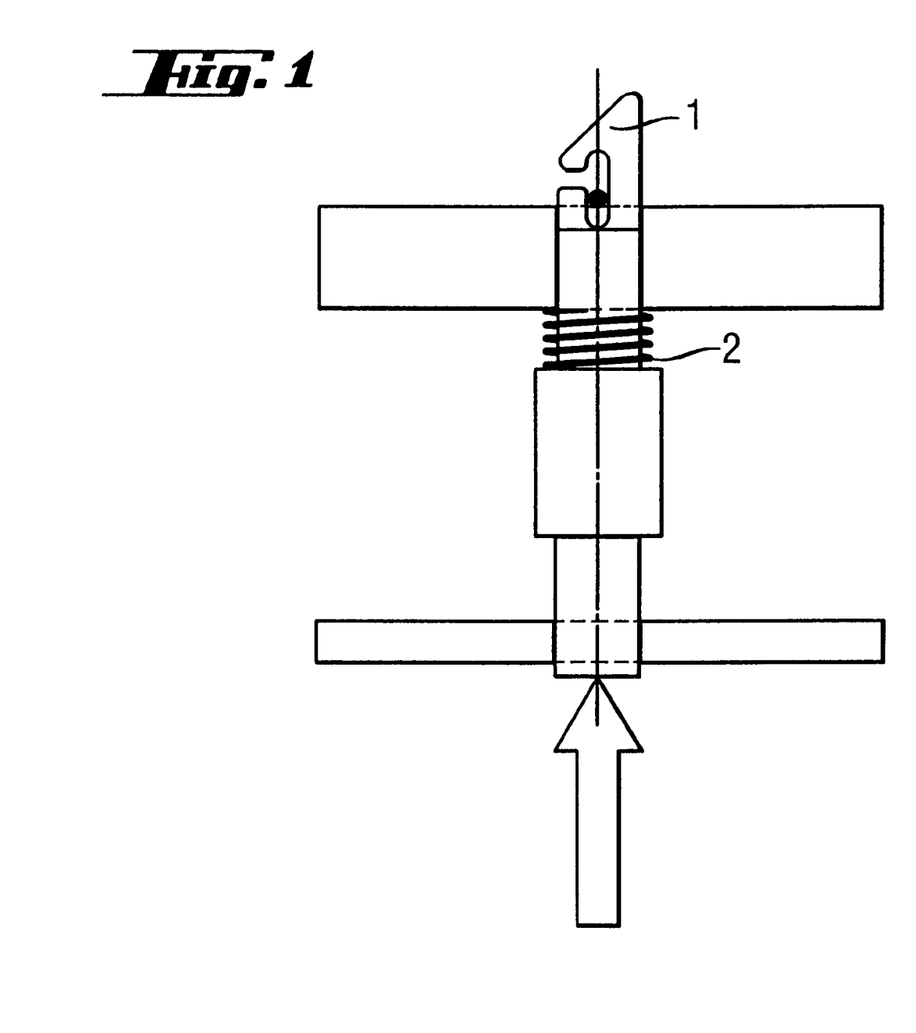
FIG. 1 shows a preferred securing member in form of a spring needle wherein the needle is a hook 1. Mechanical force (see the arrow) will overcome the force of a spring 2 and open/release a carrier net and fixed reinforcing material (not shown).
Figure 2:
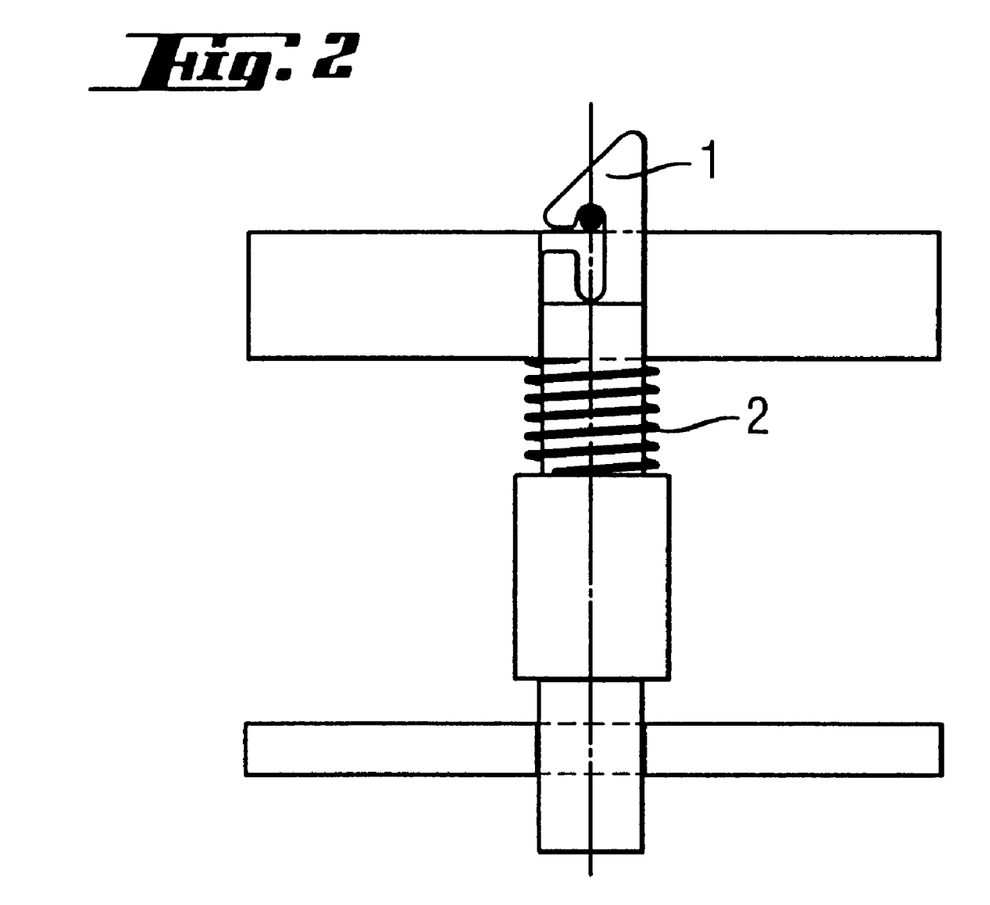
FIG. 2 shows the spring needle of FIG. 1 wherein the lack of mechanical force closes and lock the carrier net and reinforcing material due to the spring force provided by the spring 2.

The carrier net may be fixed in the frame by securing components such as those described in WO 95/35200, or by securing components such as a spring needle of the type shown in FIGS. 1 and 2 hereof, for example. Such spring needles have the advantage that they can be easily used in mass production of the three-dimensionally shaped articles according to the invention. This construction allows automatic release of the carrier net by a spring force. Preferably, the securing components are constructed in the form of a spring needle wherein the needle has the form of a hook as shown in FIGS. 1 and 2.

The laminate formed according to the invention will be formed of at least one of a matrix material and a reinforcing material. Such material can be disposed in the form of individual layers.

The matrix material can be any thermoplastic polymer or thermosetting plastic. Suitable matrix materials are described in WO 95/35200, DE-A-19625800, DE-A-19625798, DE-A-19625785, DE-A-19625797 and DE-A-19625786, the entire disclosures of which are hereby incorporated by reference. The matrix material can be in form of a textile fabric, i.e. a woven, nonwoven, or knitted textile fabric material. Suitable examples in which form the matrix material can be employed are described in WO 95/35200, DE-A-19625800, DE-A-19625798, DE-A-19625785, DE-A-19625797 and DE-A-19625786, incorporated by reference herein.

The reinforcing material preferably is in fiber form or in form of a textile material comprising the fibers. The reinforcing material can be any suitable organic material, inorganic material, or mixture thereof Examples of suitable organic and inorganic materials are described in WO 95/35200, DE-A-19625800, DE-A-19625798, DE-A-19625785, DE-A-19625797 and DE-A-19625786, incorporated by reference herein. Preferred reinforcing materials are glass fiber, carbon fiber, aramide fiber, metal fiber, or mixtures thereof with thermoplastic polymer, i.e., so-called hybrid yarn.

The degree and position of reinforcement can be controlled in different manners. It is possible to use fiber, yarn, or strips to build up crossing points of reinforcing material in order to have a relatively high degree of reinforcement. This technique is illustrated by FIGS. 3B, 3C, and 3D. FIGS. 3B and 3C show reinforcing yarns which form crossing points. Such crossing points have a relatively high degree of reinforcement relative to the remainder of the laminate. The fiber, yarn, and strips are fixed at the securing components of the frame.

Figure 3A:
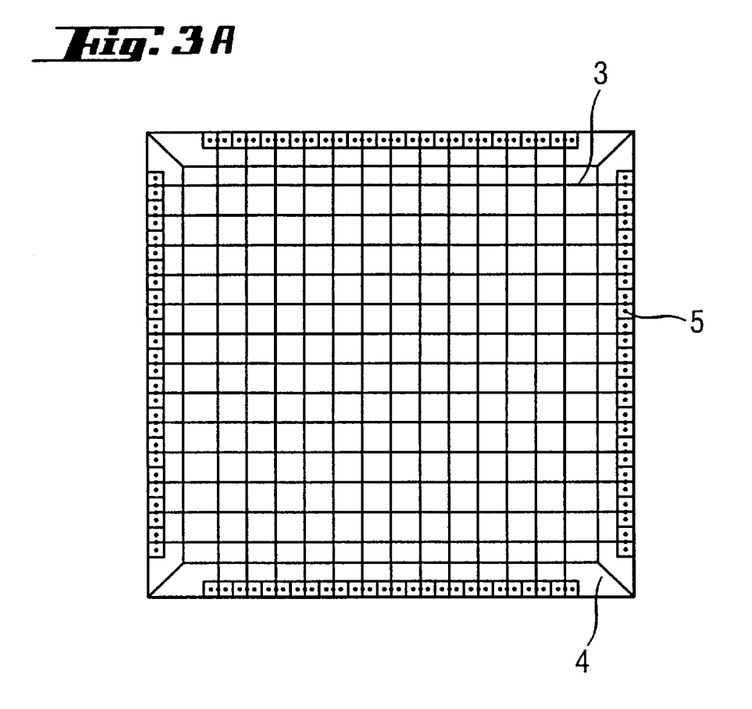
FIG. 3A shows a carrier net 3 fixed in a frame 4 by securing components 5.
Figure 3B:
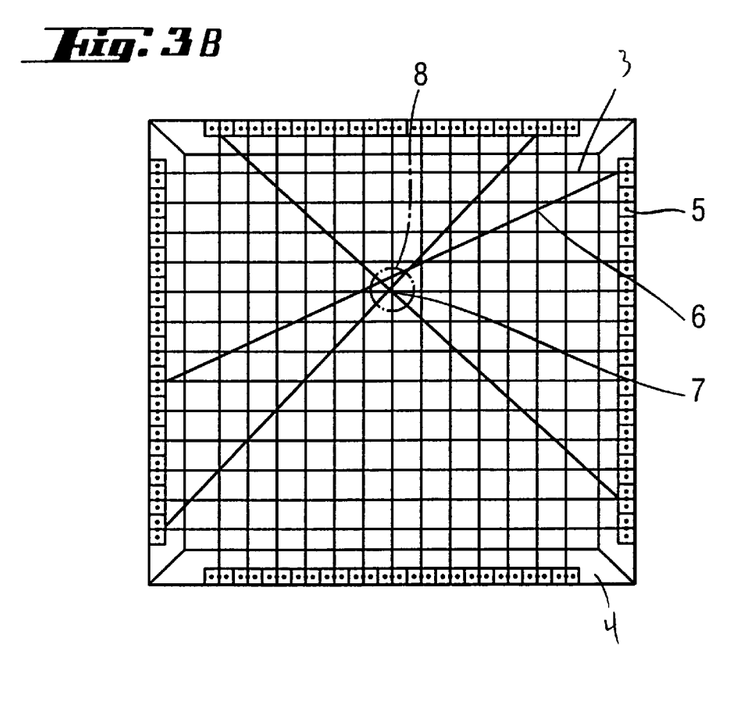
FIG. 3B shows the carrier net and frame of FIG. 3A with reinforcing yarns 6 being fixed by the securing components 5 forming crossing points 7. The crossing points being an area 8 (see the circle) having a higher degree of reinforcement.
Figure 3C:
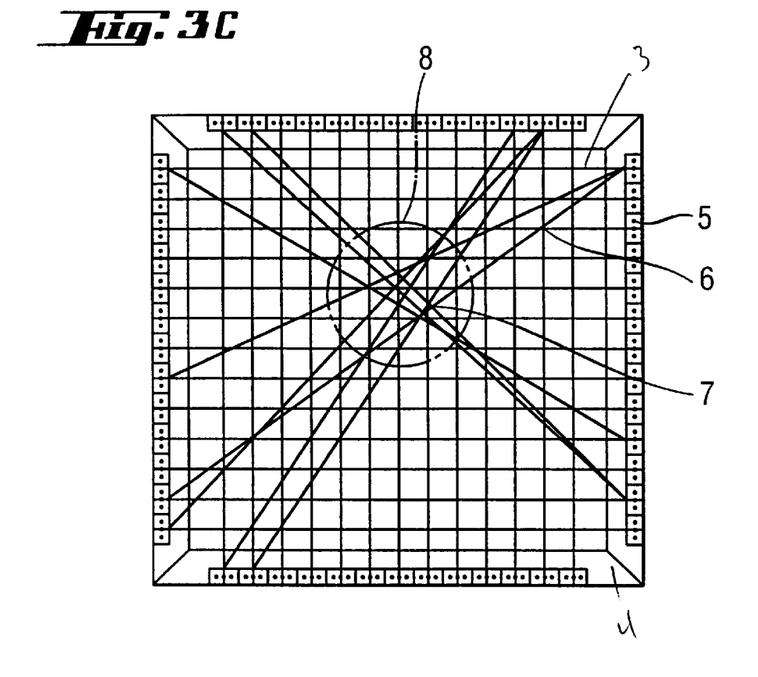
FIG. 3C shows the carrier net, frame, and reinforcing yarns of FIG. 3B with the reinforcing yarns 6 being fixed by securing components 5 forming crossing points 7, with the crossing points being an area 8 (see the circle) having a relatively high degree of reinforcement 7.
Figure 3D:
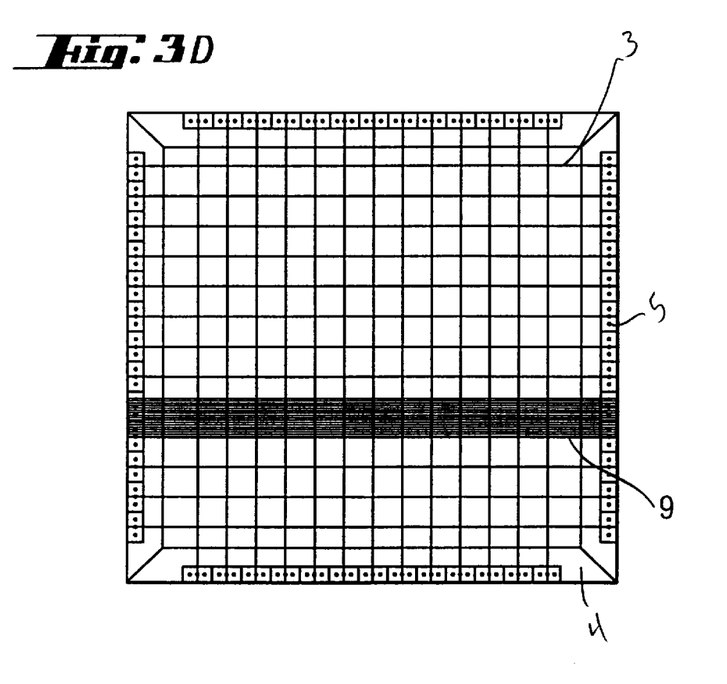
FIG. 3D shows the carrier net and frame of FIG. 3C with reinforcing strips 9 being fixed by securing components 5.
Figure 3E:
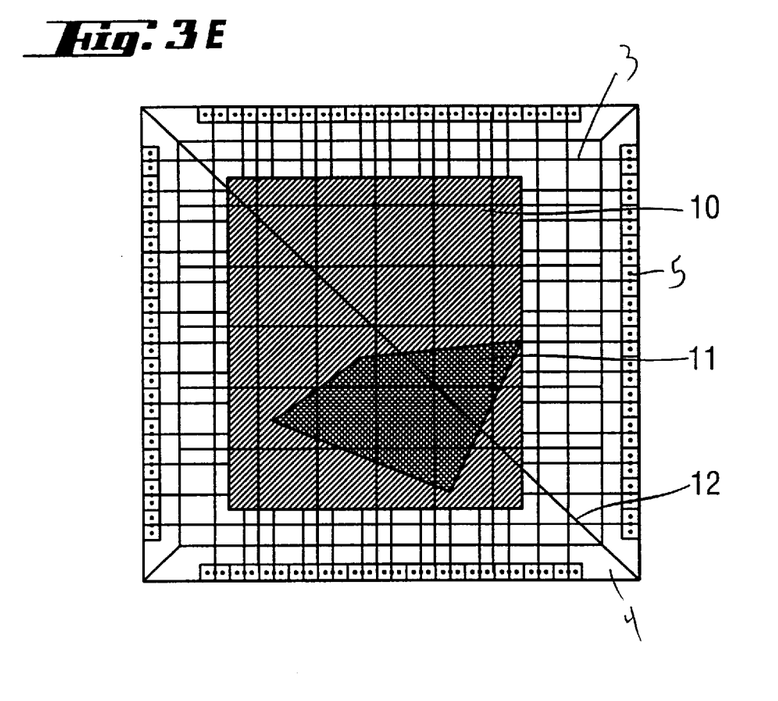
FIG. 3E shows a carrier net and frame of FIG. 3A with two textile layers 10 (light gray) and 11 (heavy gray) as reinforcing material. The layers 10 and 11 are fixed in place by a yarn 12.
Figure 3F:
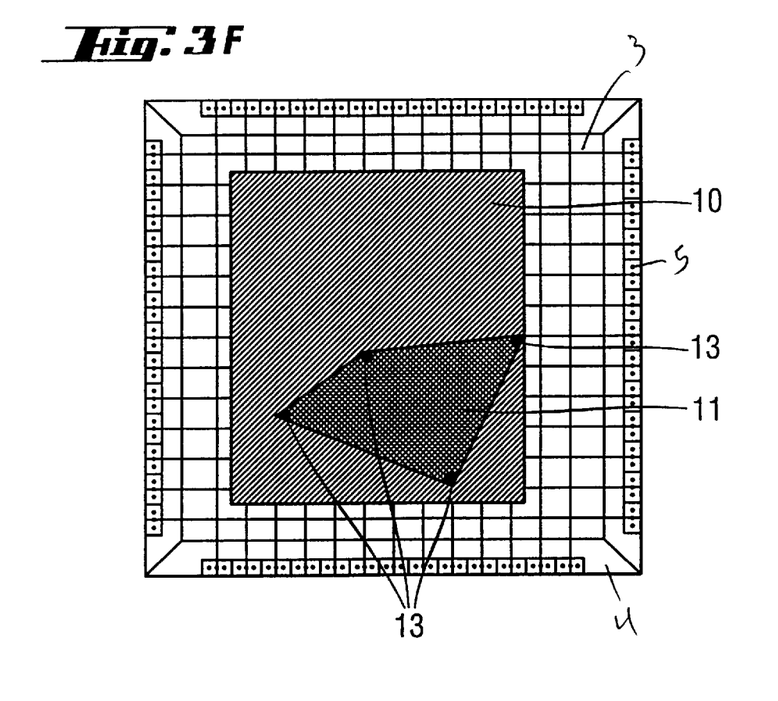
FIG. 3F shows the carrier net and frame of FIG. 3A with two textile layers 10 (light gray) and 11 (heavy gray) as reinforcing material. The layers 10 and 11 may be fixed overall or just in points 13 by adhering, needling and/or welding.

Another means of controlling reinforcement is to deposit reinforcing textile material as shown in FIGS. 3E and 3F. Such reinforcing layer(s) can be fixed on the carrier net (FIG. 3A) or previously deposited layer by welding, needling, or any other suitable method which will fix the material. It is also preferred to fix the reinforcing layer with a yarn or fiber to form a sandwich structure or stacked laminate as shown in FIG. 3E.

An important element of the invention is that the degree and position of reinforcement in the planar laminate corresponds to a specific position of the three-dimensionally shaped article. This can be controlled by depositing the individual layers on the carrier net fixed in a frame which has a marker component. The marker component of the frame allows only a specific position of the frame in the mold.

Another aspect of the invention is that by the method described herein it is possible to create regions with different morphology, meaning that the appearance or design of the finished article can be controlled, i.e. by colored fibers, etc. It is further possible to add so-called primer material to the laminate material to achieve better adhesion of the further layer to be deposited. It is also possible to incorporate other materials having different physical and/or chemical behaviors in order to improve the three-dimensionally shaped article or simply to change the look of the three-dimensionally shaped article.

The arrangement of the laminate is secured in the mold by means of the securing components of the pressing frame and the mold, for example as described in WO 95/35200, incorporated by reference herein.

Figure 4:
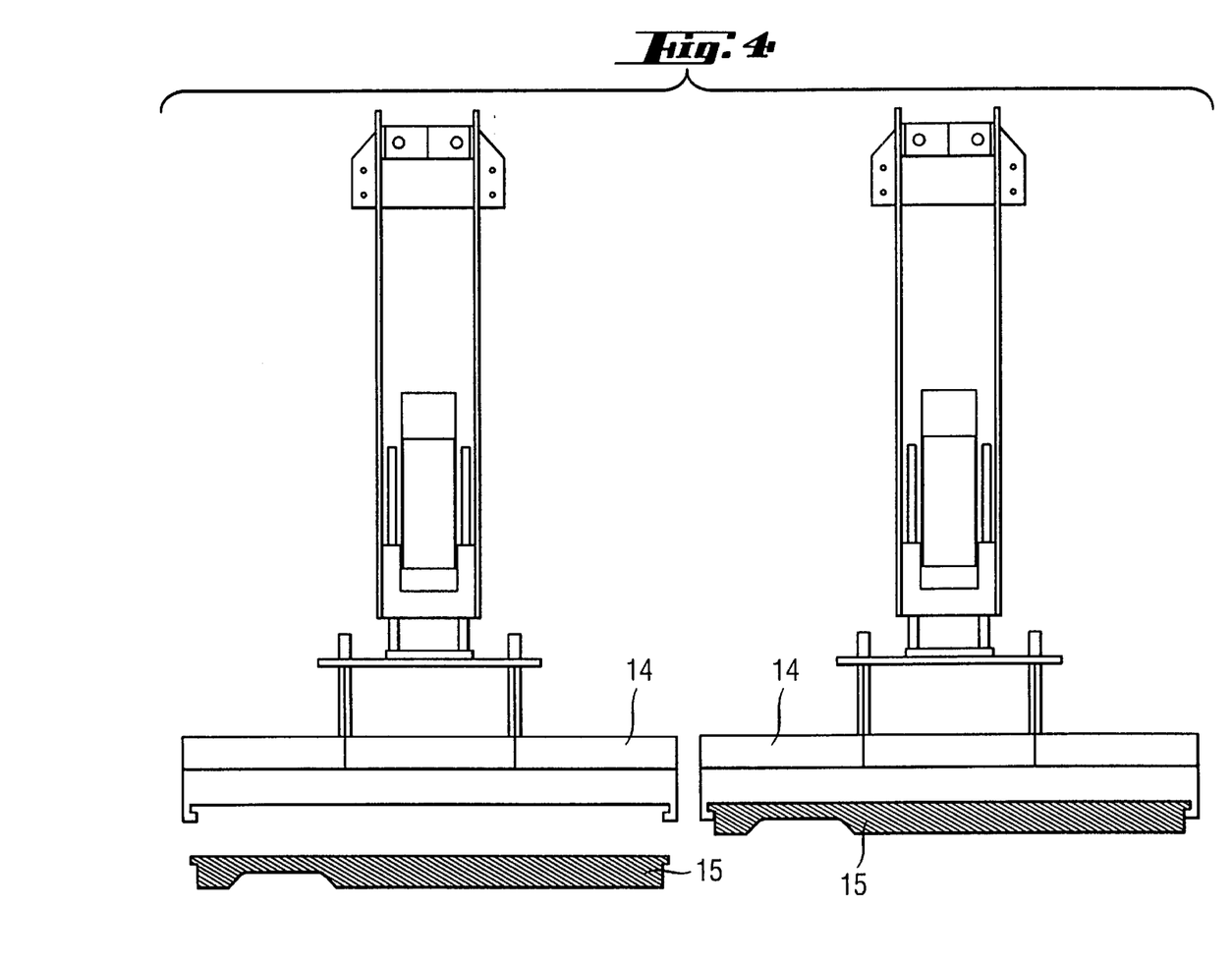
FIG. 4 shows a contact heater 14 with a replaceable heating plate 15.

Subsequent to forming the laminate, the laminate is heated to a processing temperature that applies to the chosen matrix material, according to step (b) of the inventive method. The heating will initiate a chemical reaction in the matrix material if a hardening plastic is used. When using thermoplastic matrix materials, the laminate is kept at the processing temperature of the chosen matrix material until consolidation during pressing has been completed. Heating can be carried out stepwise or in different heaters, e.g., by contact heater in order to prevent thermal shrinkage of the material. In the case the laminate is not of uniform thickness it is preferred to use a contact heater having a contour heating plate which reflects the non-uniform thickness of the laminate to be heated. Such a contact heater having contour heating plates is shown in FIG. 4. It is further preferred to heat only the carrier net and the laminate for economical reasons. It is also possible to heat the carrier net and laminate together with the frame.

It is preferred that the laminate is heated by contact heating between two heated surfaces to a temperature immediately below the sticking temperature of the plastic, as described in WO 95/35200, incorporated by reference herein. However, the temperature should be as high as possible without the material sticking to the heating surfaces used.

After such heating, the carrier net with the laminate deposited thereon is carried to a further process step in which the laminate is heated to a desired process temperature, preferably in a hot-air oven. Alternatively, the heating to the process temperature may take place by means of other heat sources, such as radiated heat, ultrasonic sound and/or a high-frequency heater.

The laminate thus heated is then carried to a process step as shown in FIGS. 6, 7, and 8 of WO 95/35200, incorporated by reference herein. In this step the carrier frame with the deposited laminate is introduced between a pressing frame, comprising a positive mold part, and a lower mold, comprising a negative mold part. Positioning of the frame is effected by marker components of the frame. The carrier net is transported from the preceding process step and through a succeeding process step by means of transport equipment supporting the frame, such as transport equipment including rails placed at such distance from each other that the formed laminate is located in the middle of the carrier net at a distance from the frame sides which rest on the transport equipment. Thus, there is room for the heating members having shaped heating surfaces and the hot-air oven to encircle the whole laminate without having to encircle the frame and the transport equipment.

After the laminate is positioned between the pressing frame and the mold, the pressing frame is moved down toward the mold, thus actuating the securing components in the shape of cooperating surfaces on the pressing frame and a surface on the mold. This situation is illustrated in FIG. 7 of WO 95/35200, incorporated by reference herein. At the same time as the laminate is secured by the securing components, the carrier net is released from the frame.

The succeeding process step is seen in FIG. 8 of WO 95/35200, incorporated by reference herein, where the product is given its three-dimensional shape, as the pressing frame is displaced further down toward the mold so that the positive mold part is introduced into the negative mold part, with the laminate placed between them, simultaneously obtaining its three-dimensional shape. As the mold is closing, the laminate 18 in FIG. 8 of WO 95/35200 is consolidated in its final shape. This takes place within very few seconds.

When a pressure is established (step (c) of the inventive method), the individual layers of the deposited laminate will enter into close contact with each other; since the matrix material will at the same time consolidate during the pressing, the product will be in its three-dimensional shape. During this shaping step, the reinforcing fibers, yarns and/or strips will be secured and consequently will retain their orientation and position during and after the three-dimensional shaping. Even in the area that is given the largest distance away from the planar original laminate, the fibers will be evenly distributed throughout the product surface. As a result thereof, better and more well-defined mechanical properties may be obtained in the formed three-dimensional product.

Afterward, the three-dimensionally shaped article will be released (step (d)) and removed from the mold (step (e)).

Thermosetting plastic or thermoplastic may be used in the process. Heating of different materials must be done to different temperatures and serves different purposes, as is known in the art. When using thermosetting plastic there will often be a requirement for a heating for initiation of the chemical process of consolidation of the laminate. If a thermoplastic material is used, the heating is required for accomplishing the very chemical process of laminate consolidation.

The choice of temperature, interval, and consolidation times will depend on the selected materials. As this will be known to a person having skill in the art, a more detailed description of this need not be given herein.

According to a particularly advantageous embodiment, the carrier net is formed from the same reinforcement fibers that are mixed with the same matrix as used in the fiber arrangement. In this manner it is possible that the carrier net, which is released from the frame such as described above, forms part of the finished three-dimensional product without being visible in the finished web. It is also possible to use a carrier net of other types of reinforcement fibers. The carrier net is advantageously formed by means of supplies on rolls that are placed at one side and at one end of the carrier frame and which are displaced automatically across the carrier frame either according to a pattern, in order to form one continuous fiber in the same manner as a racket is stringed, or just in order to provide one or two adjacent fibers in the carrier net. It is not essential how the carrier net is formed on the frame. This may take place manually, if desired. It is important, however, that the carrier frame be provided with securing components such as shown herein or similar components which make it possible to secure and release the carrier net during the process.

In the method according to the invention the mold used will frequently be polygonal, preferably quadrangular. It is possible, however, to use molds with any outer contours.

In case that the local reinforcement of the laminate will result in a laminate having different thickness it is possible to use a mold which will reflect the different thickness.

With the apparatus according to the invention the method will be suited for industrial use. The frame may have a marker which allows positioning of the frame and the laminate in the mold and is provided with a suspended carrier net wherein each thread of the net preferably comprises reinforcement fibers, which may be mixed with the same matrix as has been used in the fiber arrangement. Alternatively, the net thread may be composed of pure reinforcement fibers or be mixed with a different matrix which is different from the matrix used in the fiber arrangement. A simple structure is obtained wherein the deposited laminate may be conducted through different stations in which the method is exerted at the same time as the carrier net may be incorporated as part of the finished product.

As the product is deposited on the carrier net and since the mold and the pressing frame, which has a smaller extent than the carrier frame, comprise the securing components, the handling equipment is simplified. Thus it is possible to use a surface of the mold which cooperates with a surface of the pressing frame, which is simultaneously used for giving the product its three-dimensional shape. When upon heating the product is pressed and simultaneously secured as described above, the carrier net may be released from the carrier frame and enter into the finished product when the pressing frame presses down onto and holds the laminate on holding surfaces of a mold. When the carrier net is composed of reinforcement fibers corresponding to those used for the product, a particularly preferable application of the method is obtained.

The invention is particularly suitable for producing three-dimensionally shaped articles useful in the aviation and automotive industries.

EXAMPLE

The practice of the invention will be illustrated by reference to the following non-limiting example.

A quadrangular carrier frame of a size of 800 mm by 850 mm carries spring needles in each side, with a distance of 100 mm between the spring needles.

A carrier net consisting of one yarn per 10 cm in both directions is fixed to this frame by the spring needles. The yarns are hybrid yarns of 2000 dtex (1800 denier) PET (polyethylene terephthalate) commingled with 3000 dtex (2700 denier) glass.

On the upper side of the carrier net there are deposited four layers of reinforcing webs each consisting of five yarns per cm in both directions. The yarns are hybrid yarns of 2000 dtex (1800 denier) PET commingled with 3000 dtex (2700 denier) glass.

As to be seen in FIGS. 3A, 3B, and 3C, more reinforcing hybrid yarn as described having the same denier as the other reinforcing jams are deposited in different directions both to reinforce the area 8 (FIGS. 3B and 3C) and to reinforce in special direction of higher load.

The resulting sandwich structure is put into a heating area, heated to a processing temperature of 280° C., put into the press and shaped between a positive mold part and a negative mold part. After deformation, the press and the shaped article are cooled to 110° C. to release and remove the three-dimensional formed article from the press.

The foregoing detailed description is given for clearness of understanding only, and no unnecessary limitations should be understood therefrom, as modifications within the scope of the invention may become apparent to those skilled in the art.

What is claimed is:

1. A method of producing fiber-reinforced, three-dimensionally shaped products, said method comprising the steps of:
   (a) depositing individual layers of matrix and reinforcing material, each having an orientation, to form a laminate on a carrier net which has been secured in a frame by spring needles;
   (b) heating the laminate of step (a);
   (c) pressing the heated laminate of step (b) in a mold into a desired three-dimensional shape to form a three-dimensionally shaped article, the orientation of the reinforcing material remaining unchanged;
   (d) releasing the three-dimensionally shaped article of step (c) from the mold; and,
   (e) removing the three-dimensionally shaped article of step (d) from the mold, wherein:
   (f) the laminate of step (a) comprises defined areas of higher reinforcement relative to the remaining area of the laminate which correspond to defined areas of higher strength in the three-dimensionally shaped article;
   (g) the frame of step (a) is a positioning frame which allows the laminate to be located in a specific, proper position in the mold, said positioning frame having a mechanical, physical, electrical, or optical marker which allows positioning the frame and positioning the laminate in the mold; and,
   (h) the individual layers of the laminate are secured in said frame at more than one point.

2. The method of claim 1, wherein the reinforcing material is in the form of fibers.

3. The method of claim 2, wherein the reinforcing fibers comprise at least one of glass fibers, carbon fibers, and aramide fibers.

4. The method of claim 2, wherein the reinforcing fibers are hybrid yarn.

5. The method of claim 1, wherein the matrix material is a thermoplastic material.

6. The method of claim 1, wherein the matrix material is a thermosetting plastic.

7. The method of claim 1, comprising the step of forming the areas of higher reinforcement with crossing points of reinforcing yarns.

8. The method of claim 1, comprising the step of forming the areas of higher reinforcement with reinforcing strips.

9. The method of claim 1, comprising the step of forming the areas of higher reinforcement being formed by reinforcing layers.

10. The method of claim 1, wherein the carrier net comprises hybrid yarn.

11. The method of claim 1, wherein the carrier net is secured in the frame by spring needles having a hook.

12. The method of claim 1, wherein the reinforcing material is fixed in the laminate or on the carrier net, overall, in part, or in points by at least one of needling, welding, and adhesion.

13. The method of claim 1, wherein the reinforcing material is fixed by an additional net.

14. The method of claim 13, wherein the net comprises reinforcing material.

15. The method of claim 13, wherein the net comprises hybrid yarn.

16. The method of claim 1, comprising the step of heating the laminate in a contact heater having contour heating plates which correspond to the thickness of the laminate.

* * * * *